United States Patent Office 3,803,306
Patented Apr. 9, 1974

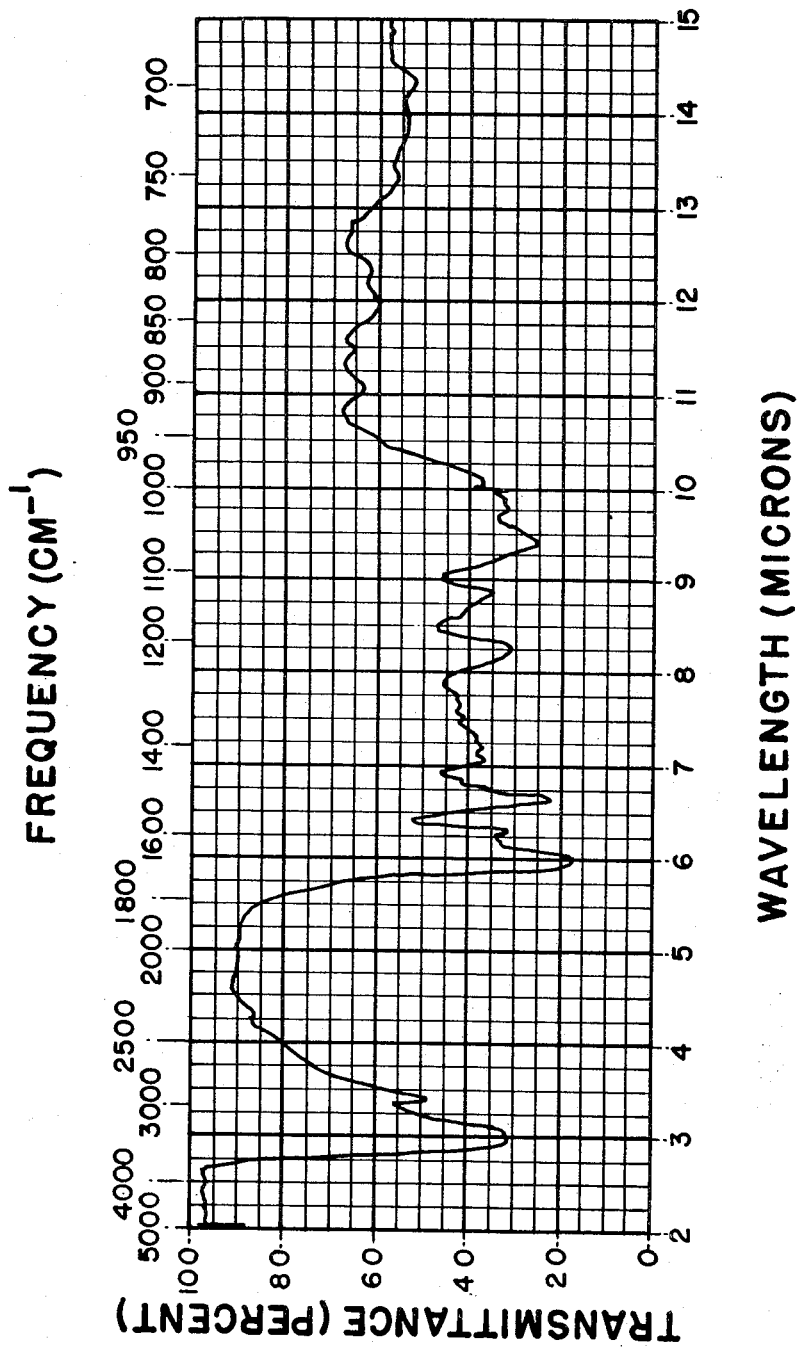

3,803,306
ANIMAL FEED COMPOSITION CONTAINING ANTIBIOTIC AM374 AS A GROWTH PROMOTER
Martin Paul Kunstmann, Pearl River, N.Y., and John Norman Porter, Ramsey, N.J., assignors to American Cyanamid Company, Stamford, Conn.
Application Apr. 6, 1970, Ser. No. 26,101, now Patent No. 3,700,768, which is a continuation-in-part of abandoned application Ser. No. 815,652, Apr. 14, 1969. Divided and this application June 22, 1971, Ser. No. 155,538
Int. Cl. A61k 21/00
U.S. Cl. 424—118
3 Claims

ABSTRACT OF THE DISCLOSURE

Antibiotic AM374 produced by fermentation of *Streptomyces eburosporeus* n.s. is used as a growth promoter for animals in a conventional animal feed.

CROSS-REFERENCE TO RELATED APPLICATIONS

This application is a division of our copending application Ser. No. 26,101, filed Apr. 6, 1970, now U.S. Pat. No. 3,700,768, issued Oct. 24, 1972, which, in turn, is a continuation-in-part of our application Ser. No. 815,652, filed Apr. 14, 1969, now abandoned.

BACKGROUND OF THE INVENTION

The invention relates to an improved animal feed composition containing a new antibiotic which is effective in accelerating the growth rate of animals such as chicks, turkey poults, ducklings, etc., as well as young cattle, horses, swine, dogs, and sheep. An effective omount of the new antibiotic is preferably added to a nutritionally balanced animal feed and fed to the animals to increase the growth rate thereof. Alternatively, the new antibiotic may be added to drinking water for ingestion by the animals as an aid in controlling infectious diseases.

SUMMARY OF THE INVENTION

The new antibiotic, which we have designated AM374, is formed during the cultivation under controlled conditions of a new streptomycete isolated from a soil sample collected in Utah. A viable culture of the new microorganism has been deposited with the Culture Collection Laboratory Northern Utilization Research and Development Division, United States Department of Agriculture, Peoria, Ill. and has been added to its permanent collection. It is freely available in this repository under its Accession No. NRRL 3582.

The description and identification of this new microorganim, maintained in the culture collection of Lederle Laboratories, Pearl River, N.Y., was supplied by Dr. H. D. Tresner of these laboratories.

Observations were made of the cultural, physiological and morphological features of the culture in accordance with the methods detailed by Shirling et al. ["Methods for Characterization of *Streptomyces* Species," Internat. Journ. of Syst. Bacteriol. 16: 313–340 (1966)]. Media used in the study were selected from those recommended by Pridham et al. ["A Selection of Media for Maintenance and Taxonomic Study of Streptomyces." Antibiotics Annual (1956–1957), pp. 947–953] for the cultivation of streptomycetes. Details are recorded in Tables I–IV, and a general description of the culture is given below. Descriptive colors were taken from Jacobson et al. ["Color Harmony Manual" 3rd ed. (1948)].

Amount of growth.—Moderate on most media; good on potato dextrose agar; light on Czapek's solution agar.

Aerial mycelium and/or en masse spore color.—Aerial mycelium whitish on most media; becoming Ivory (2 db) to Lt. Ivory (2 ca) in areas of sporulation.

Soluble pigments.—Yellowish on several media; none on Czapek's solution, asparagine-dextrose and inorganic salts-starch agars.

Reverse color.—In yellowish shades on most media.

Miscellaneous physiological reactions

Nitrates not reduced to nitrites in organic nitrate broth; complete liquefaction of gelatin in 7 days; melanin not produced on peptone-iron agar. Carbon source utilization according to the Pridham et al. [J. Bact. 56: 107–114 (1948)] method as follows: fair to good utilization of l-arabinose, d-fructose, i-inositol, lactose, d-mannitol, d-melibiose, salicin, d-trehalose, d-xylose; poor to nonutilization of l-rhamnose, adonitol, d-melezitose, d-raffinose and sucrose.

Micromorphology

Aerial mycelium sparse, giving rise to long tangled and flexuous chains of elliptical to elongate spores 0.5 to $0.6\mu$ x 1.0 to $1.3\mu$. Spore surface smooth, as determined by electron microscopy.

On the basis of the general characteristics observed, the microorganism becomes a member of the genus Streptomyces. A comparison of the culture NRRL 3582 was madew ith all available reference specimens of other streptomycetes having similar basic taxonomic features. Two species had several characteristics in common with NRRL 3582; however, when the literature descriptions of these related species were examined, certain basic differences were found. These are set forth in Table V. In addition to these differences, NRRL 3582 generally produces a markedly more restricted growth on most media and its sporulation tends to be more sparse.

It will be noted in Table V that the sporophore morphology of NRRL 3582 is of the Rectus-Flexibilis type of Pridham et al. [Appl. Microbiol. 6: 52–79 (1958)], whereas that of the other two species is Spira. This is a very fundamental difference, and it alone is adequate to distinguish between the organisms. When considered together with the other differences indicated, NRRL 3582 stands out sufficiently from the others to be regarded as a separate species.

In keeping with the ivory color of the spores produced by the organism, the name *Streptomyces eburosporeus* n.s. is proposed as an appropriate descriptive epithet.

TABLE I

Cultural characteristics of *Streptomyces eburosporeus* n.s. NRRL 3582

Incubation, 14 days
Temperature, 28° C.

| Medium | Amount of growth | Aerial mycelium and/or spores | Soluble pigment | Reverse color | Remarks |
| --- | --- | --- | --- | --- | --- |
| Czapek's solution agar. | Light | Aerial mycelium whitish, becoming Ivory (2 db) to Lt. Ivory (2 ca) in sporulation zones. Sporulation light. | None | Lt. Melon Yellow (3 ea). | Growth restricted. |
| Asparagine dextrose agar. | Moderate | Aerial mycelium whitish, sparse. No sporulation. | do | Bamboo (2 fb) | Growth restricted; colony edge serrate. |
| Hickey and Tresner's agar. | do | Aerial mycelium whitish, becoming Ivory (2 db) to Lt. Ivory (2 ca) in sporulation zones. Sporulation light. | Yellowish; light | Lt. Amber (3 ic) | Surface growth papillose. |
| Yeast extract agar | do | Aerial mycelium whitish; trace of sporulation. | do | Lt. Amber (3 ic) | Surface rugose. |

TABLE I—Continued

| Medium | Amount of growth | Aerial mycelium and/or spores | Soluble pigment | Reverse color | Remarks |
|---|---|---|---|---|---|
| Kuster's oatflake agar. | do | Aerial mycelium whitish, becoming Ivory (2 db) to Lt. Ivory (2 ca) in sporulation zones. Sporulation light. | Yellowish-brown; light. | Lt. Melon Yellow (3 ea). | Moderate starch hydrolysis. |
| Tomato paste, oatmeal agar. | do | do | Orange-yellow; moderate. | Lt. Amber (3 ic) | Surface papillose. |
| Potato dextrose agar. | Good | Aerial mycelium whitish, sparse, becoming Ivory (2 db) in Lt. Ivory (2 ca) in sporulation zones. Sporulation light. | do | do | Starch hydrolysis light. Colony surface rugose to rimose. |
| Bennett's agar | Moderate | Aerial mycelium whitish, sparse. Trace of sporulation. | Yellowish; light | do | Surface wrinkled and papillose. |
| Inorganic salts starch agar. | do | Aerial mycelium whitish, becoming Ivory (2 db) to Lt. Ivory (2 ca) in sporulation zones. Sporulation light. | None | Lt. Melon Yellow (3 ea). | |

TABLE II
Micromorphology of *Streptomyces eburosporeus* n.s. NRRL 3582

| Medium | Aerial mycelium and/or sporiferous structures | Spore shape | Spore size | Spore surface |
|---|---|---|---|---|
| Kuster's oatflake agar | Aerial mycelium sparse, giving rise to long tangled and flexuous chains of spores. | Elliptical to elongate | Spores 0.5–0.6μ x 1.0–1.3μ | Smooth as determined by electron microscopy. |

TABLE III
Miscellaneous physiological reaction of *Streptomyces eburosporeus* n.s. NRRL 3582
Temperature, 28° C.

| Medium | Incubation period | Amount of growth | Physiological reaction |
|---|---|---|---|
| Organic nitrate broth | 7 days | Good | No nitrate reduction. |
| Do | 14 days | do | Do. |
| Gelatin | 7 days | do | Complete liquefaction. |
| Peptone-iron agar | 24 hours | Moderate | Melanin not produced. |

TABLE IV
Carbon source utilization pattern of *Streptomyces eburosporeus* n.s. NRRL 3582

Incubation: 10 days. Temperature: 28° C.

| Carbon source: | Utilization [1] |
|---|---|
| Adonitol | 0 |
| l-arabinose | 3 |
| d-Fructose | 2 |
| i-Inositol | 3 |
| Lactose | 3 |
| d-Mannitol | 3 |
| d-Melezitose | 0 |
| d-Melibiose | 3 |
| d-Raffinose | 0 |
| l-rhamnose | 1 |
| Salicin | 3 |
| Sucrose | 0 |
| d-Trehalose | 3 |
| d-Xylose | 3 |
| Dextrose | 3 |
| Negative control | 0 |

[1] 3, Good utilization; 2, fair utilization; 1, poor utilization; 0, no utilization.

TABLE V
Comparison of Streptomyces NRRL 3582, with *S. albidoflavus* and *S. odorifer*

| | Streptomyces NRRL 3582 | *S. albidoflavus* | *S. odorifer* |
|---|---|---|---|
| Aerial mycelium and/or spore-bearing branches. | Sporophores long, flexuous and tangled. | Sporophores short, spiral-forming | Sporophores long, straight, branching; forming spiral. |
| Spore shape | Elliptical to elongate | Sperical | Sperical. |
| Gelatin liquefaction | Complete liquefaction | Rapid liquefaction | Slow liquefaction. |
| Soluble pigments | Mostly yellowish | Mostly yellowish | Mostly brownish. |
| Growth on asparagine-dextrose agar | Growth yellowish; aerial mycelium whitish, sparse. | Growth brown; aerial mycelium becoming whitish-yellow. | Growth cream colored to brownish. Aerial mycelium abundant, cream-colored. |

It is to be understood that for the production of the new antibiotic the present invention is not limited to this particular organism or to organisms fully answering the above growth and microscopic characteristics which are given for illustrative purposes. In fact, it is desired and intended to include the use of mutants produced from the described organisms by various means, such as X-radiation, ultraviolet radiation, nitrogen mustard, phage exposure and the like.

The fermentation process

Cultivation of the organism *S. eburosporeus* may be carried out in a wide variety of liquid culture media. Media which are useful for the production of the novel antibiotic include an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations, such as potassium, sodium, calcium, sulfate, phosphate, chloride, etc. Trace elements such as boron, molybdenum, copper, etc.; are supplied as impurities of other constituents of the media. Aeration in tanks and bottles is provided by forcing sterile air through or onto the surface of the fermenting medium. Further agitation in tanks is provided by a mechanical impeller. An antifoaming agent, such as 1% octadecanol, in lard oil may be added as needed.

Inoculum preparation

Shaker flask inoculum of *S. eburosporeus* is prepared by inoculating 100 milliliters of sterile liquid medium in 500 milliliter flasks with scrapings or washngs of spores from an agar slant of the culture. The following medium is ordinarily used.

| | | |
|---|---|---|
| Molasses | g | 20 |
| Glucose | g | 10 |
| Bactopeptone | g | 5 |
| Water to | ml | 1,000 |

The flasks are incubated at a temperature from 25–29° C., preferably 28° C., and agitated vigorously on a rotary shaker for 30 to 48 hours. These 100 milliliter inocula are used to inoculate 1 liter and 12 liter batches of the same medium in 2 liter and 20 liter glass fermentors. The inoculum mash is aerated with sterile air while growth is continued for 30 to 48 hours. These batches of inocula are used to inoculate tank fermentors.

Tank fermentation

For the production of the antibiotic in tank fermentors the following fermentation medium is preferably used.

|  | G. |
|---|---|
| Soy bean flour | 10 |
| Cerelose | 10 |
| Sodium chloride | 5 |
| Calcium carbonate | 1 |
| Distillers' solubles from corn | 5 |
| Water to 1,000 milliliters. | |

Each tank is inoculated with 3 to 10% of inoculum made as described above. Aeration is supplied at the rate of 0.5–1.0 liter of sterile air per liter of broth per minute and the fermenting mixture is agitated by an impeller driven at 200–400 r.p.m. The temperature is maintained at 25–29° C., usually at 28° C. The fermentation is ordinarily continued for 65–90 hours, at which time the mash is harvested.

Purification procedure

After the fermentation is completed, the fermented mash containing the antibiotic of this invention is filtered, preferably at pH 6, to remove the mycelium. Diatomaceous earth or any other conventional filtration aid may be used to assist in the filtration. Normally the mycelial cake is washed with water and the wash is pooled with the filtrate. The antibiotic activity is adsorbed onto Darco G-60, or other suitable charcoal adsorbant, using 0.5% (weight/volume) of the adsorbant. The antibiotic activity retained on the charcoal may be eluted by stirring the charcoal for about one-half hour with 40% aqueous acetone adjusted to pH 2 with concentrated sulfuric acid, using a volume of eluate equal to about one-quarter of the original beer volume. The eluate is concentrated under reduced pressure to an aqueous phase equal to about one-twentieth of its original volume. The pH of this phase is adjusted to about 5.5 with barium hydroxide and the barium sulfate precipitate which forms is removed by filtration. The adjusted solution (filtrate) is further concentrated to about 400–800 ml. This concentrate is then slurried with acidified alumina (using about one-fifth of the amount of alumina in grams as compared to the volume of concentrate) and this slurry is poured onto a suitable column of acidified alumina, using approximately ten times the amount of alumina used in the charge) wet-packed in methanol. The antibiotic activity is eluted from the column with aqueous methanol (usually 25–50%) and appropriate active fractions are collected. The active fractions are combined and concentrated to a small volume (one liter or less) under reduced pressure. The pH of this concentrate is adjusted to about 6.0 to 6.5 with barium hydroxide. Again, the barium sulfate precipitate which forms is removed by filtration and the clear filtrate lyophilized to yield the (crude) antibiotic AM374. This lyophilized material is now further purified by column chromatography on a suitable ion exchange resin, as for example, CM Sephadex C-25 (H+ form). The column may be eluted using dilute sulfuric acid solutions. The eluate containing the antibiotic activity, located by absorption at 280 m$\mu$, is adjusted to about pH 6.3 with barium hydroxide. The barium sulfate precipitate which forms is removed by filtration and the filtrate is concentrated to a volume of about 30–80 milliliters. The pH of this solution is adjusted to about 8.0 with IR45 (OH⁻) resin. The resin is removed by filtration and the filtrate is added to a larger quantity of acetone with stirring and the precipitate which forms is recovered by filtration. The precipitate is washed with acetone and dried at moderate temperature under reduced pressure to yield antibiotic AM374 in the base form.

Physical Characteristics

A microanalytical sample may be prepared by precipitating AM374 base from methanolic and/or ethanolic acetone and drying the precipitate under high vacuum (10⁻³ mm.) at 100° C. for two days. Antibiotic AM374 base prepared in this manner contains the elements carbon, hydrogen, oxygen, nitrogen and chlorine in substantially the following percentages by weight:

|  | Percent by wt. |
|---|---|
| Carbon | 54.54 |
| Hydrogen | 6.10 |
| Oxygen | 29.01 |
| Nitrogen | 7.60 |
| Chlorine | 2.47 |

The material does not have a definitive melting point, decomposing slowly above 250° C. Optical rotation is $[\alpha]_D^{25°} = -102°$ ($\pm 2.9$) (C=1.045 in water). Ultraviolet maxima occur at:

282 m$\mu$. ($E_{1cm.}^{1\%} = 42$) in acidic solutions,
282 m$\mu$. ($E_{1cm.}^{1\%} = 42.5$) in neutral solutions,
305 m$\mu$. ($E_{1cm.}^{1\%} = 51.5$) in basic solutions,
sh.260 m$\mu$. ($E_{1cm.}^{1\%} = 92$) in basic solutions.

An infrared absorption spectrum of AM374 base in a KBr pellet, prepared in a standard manner, exhibits characteristic absorption at the following wavelengths expressed in microns: 3.0, 3.43, 6.0, 6.20, 6.30, 6.67, 6.88, 7.05, 7.22, 7.35 sh., 7.52, 7.67, 8.2, 8.65 sh., 8.85, 9.45, 9.75, 9.90, 10.45 sh., 11.07, 11.5, 12.0, 12.35, 13.35, 14.4. The infrared curve is shown in the accompanying drawing.

AM374 antibiotic shows the following $R_f$ values in the solvent systems indicated below using *Bacillus subtilis* pH 6.0 or *Corynebacterium xerosis* as detection organisms:

| $R_f$ value: | Solvent system |
|---|---|
| 0.90 | 5% aqueous NH₄Cl |
| 0.20 | pyridine 2 parts s-collidine 2 parts sec-butanol 1 part water 1 part |

AM374 antibiotic base is readily soluble in water and dimethyl sulfoxide and moderately soluble in methanol and to a lesser extent in ethanol.

Antibiotic AM374 is clearly distinguished from other antibiotics by the characterization data given above and by its antimicrobial activity. The in vitro antimicrobial activity of this new antibiotic and its hydrolysis product is presented in the table below which shows the minimal inhibitory concentration required to inhibit the growth of representative microorganisms in a nutrient medium.

TABLE VI

In vitro antimicrobial activity of Antibiotic AM374 and its hydrolysis product [1]

|  | Minimal inhibitory concentrations (micrograms per ml.) | |
|---|---|---|
|  | Antibiotic AM374 | Hydrolysis product |
| *Staphylococcus aureus* ATCC 6538P | 3.1 | 6.2 |
| *Staphylococcus aureus* No. 69 | 3.1 | 3.1 |
| *Staphylococcus aureus*, Rose ATCC 14154 | 6.2 | 6.2 |
| *Staphylococcus aureus*, Smith ATCC 13709 | 6.2 | 6.2 |
| *Streptococcus pyogenes* C203 | 0.62 | 1.25 |
| *Streptococcus faecalis* ATCC 8043 | 3.1 | 6.2 |
| *Streptococcus sp.*, nonhemolytic No. 11 | 6.2 | 6.2 |
| *Streptococcus sp.*, β-hemolytic No. 80 | 6.2 | 6.2 |
| *Mycobacterium smegmatis* ATCC 607 | >250 | 125 |
| *Salmonella typhosa* ATCC 6539 | >250 | >250 |
| *Proteus vulgaris* ATCC 9484 | >250 | >250 |
| *Escherichia coli* U311 | >250 | >250 |
| *Escherichia coli* DY | >250 | >250 |
| *Klebsiella pneumoniae*, strain AD | >250 | >250 |
| *Enterobacter aerogenes* No. 75 | >250 | >250 |
| *Pseudomonas aeruginosa* ATCC 10145 | >250 | >250 |

[1] Using agar dilution method.

AM374 is active in vivo also against a variety of gram-positive microorganisms such as staphylococci, pneumococci, and streptococci. The new antibiotic is thereby potentially useful as a therapeutic agent in treating bacterial infections in mammals caused by such microorganisms. The new antibiotic can be expected to be usefully employed for treating or controlling such infections by topical application or parenteral administration.

The usefulness of the new antibiotic is demonstrated by its ability to control systemic lethal infections in mice. The new antibiotic shows high in vivo antibacterial activity in mice against *Staphylococcus aureus*, strain Smith; *Staphylococcus aureus*, strain Rose; *Streptococcus pyogenes*, C203; and *Diplococcus pneumoniae*, SV1 when administered by a single subcutaneous dose to groups of Carworth Farms CF–1 female mice, weight about 20 grams, infected intraperitoneally with a lethal dose of these bacteria in $10^{-2}$, $10^{\circ}$, $10^{-5}$, $10^{-6}$ trypticase soy broth TSP dilutions, respectively, of a five hour TSP blood culture.

Table VII, below, illustrates the in vivo antibacterial activity of AM374 while Table VIII, following, illustrates the in vivo antibacterial activity of the hydrolysis product.

TABLE VII.—IN VIVO ANTIBACTERIAL ACTIVITY OF ANTIBIOTIC AM374

| Dosage, mg./kg. body wt. | Alive/total mice, 14 days after infection | | | |
|---|---|---|---|---|
| | *Staphylococcus aureus* | | Streptococcus pyogenes C203 | Diplococcus pneumoniae SV1 |
| | Strain Smith | Strain Rose | | |
| 320 | | 20/20 | | |
| 80 | | 18/20 | | |
| 20 | 20/20 | 4/20 | 20/20 | 20/20 |
| 5 | 20/20 | 0/20 | 20/20 | 20/20 |
| 1.25 | 1/20 | | 3/20 | 15/20 |
| 0.32 | 2/20 | | 0/20 | 0/20 |

NOTE.—Of the infected non-treated control mice 95–100% died within 5 days after infection.

TABLE VIII.—IN VIVO ANTIBACTERIAL ACTIVITY OF AM374—HYDROLYSIS PRODUCT

| Dosage, mg./kg. body wt. | Alive/total mice, 14 days after infection— *Staphylococcus aureus* strain Smith |
|---|---|
| 20 | 5/5 |
| 5 | 3/5 |
| 1.25 | 0/5 |
| 0.32 | 1/5 |
| 0.08 | 0/5 |

As indicated earlier, the novel antibiotic is highly effective in promoting the growth rate of animals. In carrying out the present invention, an effective amount of the novel antibiotic is added to drinking water or preferably a nutritionally balanced animal feed and is fed to the animals to increase the growth rate thereof.

DESCRIPTION OF THE PREFERRED EMBODIMENTS

The invention will be described in greater detail in conjunction with the following specific examples.

EXAMPLE 1

Inoculum preparation

A typical medium used to grow the primary inoculum was prepared according to the following formula:

| | | |
|---|---|---|
| Molasses | g-- | 20 |
| Glucose | g-- | 10 |
| Bactopeptone | g-- | 5 |
| Water to | ml-- | 1,000 |

The washed or scraped spores from an agar slant of *S. eburosporeus* were used to inoculate two flasks containing 100 milliliters each of the above medium in 500 milliliter flasks. The flasks were placed on a rotary shaker and agitated vigorously for 48 hours, at 28° C. The resulting flask inoculum was transferred to a 5 gallon glass fermentor containing 12 liters of sterile medium. The glass fermentor was aerated with sterile air while growth was carried out for about 48 hours, after which the contents were used to seed a 300 liter tank fermentor.

EXAMPLE 2

Fermentation

A fermentation medium was prepared according to the following formula:

| | | |
|---|---|---|
| Soy bean flour | g-- | 10 |
| Cerelose | g-- | 10 |
| Sodium chloride | g-- | 5 |
| Calcium carbonate | g-- | 1 |
| Distillers' soluble from corn | g-- | 5 |
| Water to | ml-- | 1,000 |

The fermentation medium was sterilized at 120° C. with steam at 15 pounds pressure for 45–60 minutes. The pH of the medium after sterilization was 6.6. Three hundred liters of sterile medium in a 400 liter tank fermentor was inoculated with 12 liters of inoculum such as described in Example 1, and the fermentation was carried out at 28° C. using Hodag LG–8 oil as a defoaming agent. Aeration was supplied at the rate of 0.5 liter of sterile air per liter of mash per minute. The mash was agitated by an impeller driven at 300 revolutions per minute. At the end of approximately 70 hours of fermentation time the mash was harvested.

EXAMPLE 3

Isolation and purification 300 liters of fermented mash were filtered with about 2% (w./v.) of diatomaceous earth filter aid and the filter pad was washed with about 30 liters of water. The fermented mash was previously adjusted to pH 6.0 with sodium hydroxide. The antibiotic activity in the pooled filtrate and water wash was adsorbed onto 900 grams of Darco G–60 and colored impurities were removed from the charcoal suspension by stirring with about 30 liters of 40% aqueous acetone. The activity was eluted from the charcoal by stirring with 75 liters of 40% aqueous acetone adjusted to pH 2.0 with concentrated sulfuric acid. The suspension was filtered, the eluate was concentrated under reduced pressure to about 4 liters of aqueous phase and the pH was adjusted to 5.2 with barium hydroxide. The barium sulfate precipitate was removed by filtration and the filtrate further concentrated to about 700 ml. This concentrate was slurried with 100 g. of acid-treated alumina and poured onto a column consisting of 1 kg. acid-treated alumina in methanol. The acid-treated alumina was prepared by acidifying an aqueous slurry of Merck alumina with concentrated sulfuric acid until a constant pH of 3.0 was obtained, filtering, washing with water and methanol, and air drying. The column was then eluted with 5 liters of methanol followed by 60 liters of 50% aqueous methanol followed by 10 liters of 25% aqueous methanol. Appropriate fractions containing antibiotic AM374, determined by bioassay against *C. xerosis*, were combined and concentrated under reduced pressure to about 500 ml. and the pH was adjusted to 6.2 with barium hydroxide. The barium sulfate precipitate was removed by filtration and the filtrate lyophilized to give 5.1 grams of crude AM374 (about 30 to 50% pure).

The 5.1 grams of crude AM374 thus obtained was dissolved in 30 ml. of water and applied to a column of CM Sephadex C–25 (H⁺ form). The Sephadex (250 g.) was prepared for use by being slurried in about 3 liters of water and the pH adjusted to 2.0 with concentrated $H_2SO_4$. The excess water was decanted and the resin washed several times with water. The slurry was poured into a column (7.6 cm. I.D.) and washed with an additional 5 liters of water removing the excess acid.

The column was eluted with a gradient between 4 liters of water and 4 liters of water adjusted to pH 1.4 with concentrated sulfuric acid, followed by an additional 4 liters of water adjusted to pH 1.4. Fractions (about 100 ml. each) were collected and bioactivity (*C. xerosis*) and ultraviolet absorbance (280 mµ) were measured on 1 to 100 dilutions of these fractions.

Fractions 58 through 80 were shown to contain the majority of the desired antibiotic and were combined into one pool. The pH of this pool was adjusted to 6.3 with barium hydroxide and the precipitated barium sulfate was removed by filtration with the aid of diatomaceous earth. The filtrate was concentrated to about 200 ml. and lyophilized yielding about 1.5 grams of crude antibiotic. The crude antibiotic was dissolved in 50 ml. of water and the pH of the solution was adjusted to about 8.2 with IR45 (OH− form). The suspension was filtered and the filtrate was lyophilized. The lyophilizate was dissolved in 40 ml. of water and the antibiotic was precipitated upon the addition of 400 ml. of acetone. The crystalline precipitate was collected by filtration and dissolved in a small portion of methanol. Addition of acetone precipitated the purified antibiotic AM374 which was collected by filtration, yield 1.18 grams.

A microanalytical sample was prepared by precipitation of AM374, obtained as described above, from ethanolic acetone and drying the precipitate under high vacuum ($10^{-3}$ mm.) at 100° C. for two days. The chemical analysis of this product and the other physical and biological properties of the new antibiotic have already been described.

EXAMPLE 4

Conversion of AM374 base into AM374 sulfate

One hundred and fifty milligrams of AM374 base was dissolved in 60 ml. of warm methanol to which was added one drop of a 1:1 methanol-concentrated sulfuric acid solution. The resulting precipitate was filtered and washed with some methanol and acetone to give 98 mg. of AM374 sulfate.

Alternatively, AM374 sulfate was prepared by adjusting an aqueous solution of AM374 base to about pH 6.3 with sulfuric acid, followed by precipitation with acetone.

A microanalytical sample was prepared by precipitation from aqueous acetone and drying the precipitate under high vacuum ($10^{-3}$ mm.) at 100° C. for two days. AM374 sulfate prepared in this manner contains the elements carbon, hydrogen, oxygen, nitrogen, sulfur and chlorine in substantially the following percentages by weight:

| | |
|---|---|
| Carbon | 51.68 |
| Hydrogen | 5.85 |
| Oxygen | 30.25 |
| Nitrogen | 7.02 |
| Sulfur | 1.36 |
| Chlorine | 2.27 |

Optical rotation is $[\alpha]_D^{25} = -104°$ ($\pm 2.8°$) (c.=1.075 in water). Ultraviolet maxima occur at:

282 mµ. ($E_{1cm}^{1\%}=44$) in acidic solutions,
282 mµ. ($E_{1cm}^{1\%}=43$) in neutral solutions,
305 mµ. ($E_{1cm}^{1\%}=48$) in basic solutions,
sh.260 mµ. ($E_{1cm}^{1\%}=85$) in basic solutions.

An infrared absorption spectrum of AM374 sulfate in a KBr pellet, prepared in a standard manner, exhibits characteristic absorption at the following wavelengths expressed in microns: 3.0, 3.45, 5.75 sh., 5.90 sh., 5.99, 6.03, 6.20, 6.32, 6.67, 6.78 sh., 6.87, 7.05, 7.20, 7.53, 7.65, 8.25, 8.65 sh., 8.87, 9.45, 9.73, 9.88 sh., 10.45 sh., 11.05, 12.0, 12.35, 13.3, 14.4.

EXAMPLE 5

Conversion of AM374 base into AM374 chloride

Two hundred milligrams of AM374 base was dissolved in 10 ml of 0.1 N hydrochloric acid and concentrated to about 2 ml. under reduced pressure at which time a partially microcrystalline precipitate formed. This was filtered, the precipitate redissolved in a minimum of water and reprecipitated with acetone. This was filtered and washed with some additional acetone to give 116 mg. of AM374 chloride.

A microanalytical sample was prepared by precipitation from aqueous acetone and drying the precipitate under high vacuum ($10^{-3}$ mm.) at 100° C. for two days. AM374 chloride prepared in this manner contains the elements carbon, hydrogen, oxygen, nitrogen and chlorine in substantially the following percentages by weight:

| | |
|---|---|
| Carbon | 52.20 |
| Hydrogen | 6.22 |
| Oxygen | 28.03 |
| Nitrogen | 7.26 |
| Chlorine | 6.34 |

Optical rotation is $[\alpha]_D^{25} = -106°$ ($\pm 2.8°$) (c.=1.057 in water). Ultraviolet maxima occur at:

282 mµ. ($E_{1cm}^{1\%}=42$) in acidic solutions,
282 mµ. ($E_{1cm}^{1\%}=39.5$) in neutral solutions,
305 mµ. ($E_{1cm}^{1\%}=52$) in basic solutions,
sh.260 mµ. ($E_{1cm}^{1\%}=92$) in basic solutions.

An infrared absorption spectrum of AM374 chloride in a KBr pellet, prepared in a standard manner, exhibits characteristic absorption at the following wavelengths expressed in microns: 3.0, 3.27, 3.40, 5.75 sh., 5.90 sh., 5.98, 6.15, 6.28, 6.65, 6.82 sh., 7.03, 7.15, 7.50, 7.65, 8.25, 8.60, 8.83, 9.42, 9.70, 9.88, 10.45 sh., 11.05, 11.9, 12.3, 13.3, 14.7.

EXAMPLE 6

Acid hydrolysis product of AM374 base

One gram of AM374 antibiotic base was dissolved in 7.5 ml. of boiling water. To this was added 1.25 ml. of 5 N hydrochloric acid and the resulting solution boiled an additional 2 to 3 minutes. An additional 2 ml. of 5 N hydrochloric acid was added and the solution was cooled. This was filtere and the precipitate washed with a total of 3 ml. of 5 N hydrochloric acid. It was redissolved in water and concentrated to a residue. This was repeated twice more after which the residue was precipitated from aqueous acetone to give 516 mg. of acid hydrolysis product.

A microanalytical sample was prepared by precipitation from aqueous acetone and drying the precipitate under high vacuum ($10^{-3}$ mm.) at 100° C. for two days. The AM374 hydrolysis product prepared in this manner contains the elements carbon, hydrogen, oxygen, nitrogen and chlorine in substantially the following percentages by weight:

| | |
|---|---|
| Carbon | 52.54 |
| Hydrogen | 5.81 |
| Oxygen | 25.52 |
| Nitrogen | 8.32 |
| Chlorine | 7.11 |

Optical rotation is $[\alpha]_D^{25} = -69°$ ($\pm 3.6°$) (c.=0.839 in water). Ultraviolet maxima occur at:

280 mµ. ($E_{1cm}^{1\%}=46$) in acidic solutions,
280 mµ. ($E_{1cm}^{1\%}=51.5$) in neutral solutions,
300 mµ. ($E_{1cm}^{1\%}=86$) in basic solutions,
sh.260 mµ. ($E_{1cm}^{1\%}=143$) in basic solutions.

An infrared absorption spectrum of AM374 hydrolysis product in a KBr pellet, prepared in a standard manner, exhibits characteristic absorption at the following wavelengths expressed in microns: 3.0, 3.30 sh., 3.43, 5.75 sh., 5.92 sh., 6.0, 6.15 sh., 6.25, 6.48 sh., 6.68, 6.85, 7.03, 7.18, 7.5, 7.67, 7.95 sh., 8.30, 8.55 sh., 8.86, 9.15, 9.45, 9.9, 10.45 sh., 11.1 11.55 sh., 11.9, 13.3, 14.4.

EXAMPLE 7

The basal diet employed in the following poultry tests had the following composition.

Poultry basal diet

| Ingredient: | Gms./kg. |
|---|---|
| Ground yellow corn | 514 |
| Soybean oil meal (44%) | 300 |
| Corn gluten meal | 50 |
| Menhaden fish meal (60%) | 50 |
| Fat | 40 |
| Dehydrated alfalfa meal (17%) | 20 |
| Ground limestone | 5 |
| Dicalcium phosphate | 12 |
| Sodium chloride | 3 |
| Trace minerals [1] | 1 |
| Vitamin pre-mix [2] | 5 |

[1] Trace minerals are manganese (6.0%), iodine (.12%), iron (2.0%), copper (.2%), zinc (2.0%), cobalt (.02%), and calcium (25.5%).
[2] Vitamin pre-mix, per kg. of feed, contains 125 mg. butylated hydroxy toluene, 500 mg. DL-methionine, 3300 I.U. Vitamin A, 1100 I.U. Vitamin D₃, 2.2 I.U. Vitamin E, 11 mcg. Vitamin B₁₂, 4.4 mg. riboflavin, 27.5 mg. niacin, 8.8 mg. Pantothenic acid, 500 mg. choline chloride, 1.43 mg. folic acid, and 1.1 mg. menadione sodium bisulfite to 5 g. of ground yellow corn.

Day-old chicks (6 males and 6 females per group) purchased from a commercial supplier are housed in heated brooders and held in a chick room maintained at about 24° C. All chick groups are weighed at the start of the tests and on termination at 20 days. Feed and water are supplied ad libitum. The basal diet described above is used for all tests. Treatments used were (a) untreated controls, (b) 10 p.p.m. AM374, (c) 2 p.p.m. AM374. Data obtained are reported below where it can be seen that at both treatment levels AM374 showed a marked improvement in the growth of treated birds.

We claim:
1. An animal feed composition effective in accelerating the growth rate of animals which comprises a nutritionally balanced animal feed containing an effective amount of antibiotic AM374, a compound which
 (a) is effective in inhibiting the growth of gram-positive bacteria, and in its essentially pure crystalline form;
 (b) is readily soluble in water and dimethyl sulfoxide and moderately soluble in methanol and ethanol and relatively insoluble in other common organic solvents;
 (c) has the following elemental analysis: C, 54.54; H, 6.10; O, 29.01; N, 7.60; Cl, 2.47;
 (d) has ultraviolet maxima at:

282 m$\mu$. ($E_{1cm}^{1\%}$=42) in acidic solutions,
   282 m$\mu$. ($E_{1cm}^{1\%}$=42.5) in neutral solutions,
   305 m$\mu$. ($E_{1cm}^{1\%}$=51.5) in basic solutions,
   sh260 m$\mu$. ($E_{1cm}^{1\%}$=92) in basic solutions;

(e) has an optical rotation: $[\alpha]_D^{25°}$=−102° (±2.9°) (c.=1.045 in water); and
 (f) has a characteristic infrared absorption spectrum as shown in the drawing.

2. A feed for animals containing at least 2 p.p.m. of antibiotic AM374 as defined in claim 1.

3. A process for increasing growth rate and for improving feed efficiency in animals which comprises feeding animals a nutritionally balanced animal feed containing an effective amount of antibiotic AM374 as defined in claim 1.

EFFICIENCY BY CHICKS RECEIVING RATIONS CONTAINING AM374H GROWTH AND FEED

| Feed additive | Level (p.p.m.) | Experiment number | 0–20 day gain (g.) | Feed/ gain | Survival ratio | Percent improvement Gain | Percent improvement F/G |
|---|---|---|---|---|---|---|---|
| None | | A | 266 | 1.70 | 29/30 | | |
| AM374H | 10 | A | 284 | 1.62 | 30/30 | 6.8 | 4.9 |
| None | | B | 288 | 1.75 | 39/40 | | |
| AM374H | 2 | B | 302 | 1.63 | 18/20 | 4.9 | 7.4 |

References Cited

Chem. Abst., Seventh Collective Index, vol. 56–65 (1962–1966) p. 9183S.

SAM ROSEN, Primary Examiner

U.S. Cl. X.R.
424—119